3,190,869
PROCESS FOR N-TRIFLUORACETYLATING AMINO ACIDS AND PEPTIDES
Friedrich Weygand, Pullach, Isartal, and Adolf Röpsch, Dortmund, Germany, assignors to Farbwerke Hoechst Aktiengesellschaft vormals Meister Lucius & Brüning, Frankfurt am Main, Germany, a corporation of Germany
No Drawing. Filed Feb. 15, 1960, Ser. No. 8,503
Claims priority, application Germany, Feb. 17, 1959, F 27,722
4 Claims. (Cl. 260—112)

In the peptide synthesis the trifluoracetyl radical is of high importance as protective group for amino acids, since it can easily be split off again in an alkaline medium, without the peptide linkage being attacked. Suitable processes for the N-trifluoracetylation of amino acids and likewise of peptides are, therefore, of increasing interest.

It is already known to trifluoracetylate amino acids suspended in petroleum ether and benzene by means of trifluoracetic anhydride. The yields obtained by this reaction are in most cases, however, unsatisfactory and there is a risk that azolactones be formed so that this process did not gain an importance in industrial practice. Furthermore, amino acids are trifluoracetylated in the cold with trifluoracetic acid anhydride only. When applying this process racemisation of the amino acids via azolactones may occur.

The trifluoracetylation of amino acids in anhydrous trifluoracetic acid by means of trifluoracetic acid anhydride has gained practical importance which reaction, on precise dosage of the trifluoracetic acid anhydride, proceeds without racemisation taking place.

On using L-alanine and L-isoleucine the trifluoracetylated compounds can be obtained in a crystalline form only with difficulty when this reaction is applied. In this process peptides can likewise be trifluoracetylated at the peptide linkage whereby, on contacting them with water or alcohol, the peptides may be split.

Furthermore it is known to convert amino acids and peptides with thiotrifluoracetic acid-S-ethyl ester in an alkaline medium into the corresponding N-trifluoracetyl compounds. In the course of this reaction ethylmercaptane is formed which is of disagreeable odor. Moreover, the yields are often not so high as those obtained by trifluoracetylation with trifluoracetic anhydride in anhydrous trifluoracetic acid.

Now we have found that it is possible in a simple and quick reaction to trifluoracetylate amino acids as well as peptides without splitting of the latter taking place, by using trifluoracetic acid phenyl ester as acetylating agent.

The process according to the present invention is carried out in such a way that the amino acid or the peptide to be acylated are heated together with the trifluoracetic acid phenyl ester. It is recommendable to carry out the reaction in the presence of phenols. Phenol is preferably added. In most cases the mixtures of amino acid, trifluoracetic acid phenyl ester and phenol are heated to temperature above 100° C., preferably 120–150° C., whereby the reaction is performed within a short period of time, mostly within a few minutes. It is, however, likewise possible to operate at a lower temperature, for instance in a range between 50 and 100° C., a correspondingly prolonged period of reaction then being necessary.

It is of advantage to use an excess amount of trifluoracetic acid phenyl ester. In most cases about 1.2 to 1.5 times the calculated amount will be used.

Phenol is used in such an amount that stirring or shaking is possible. Generally, the amino acid or the peptide is dissolved in the phenol at a higher temperature. In single cases it is, however, possible that a suspension be formed. The addition of phenol can be omitted if in the heat the amino acid is easily soluble in phenol. As soon as, at the start of the reaction, small amounts of phenol are formed, the amino acid is very rapidly dissolved.

Instead of phenol other phenols may likewise serve as solvents, for instance o-cresol or polyvalent phenols. In general, the reaction, however, is performed within the shortest period when phenol is used.

The reaction mixture can be worked up in a very simple manner. As far as the compounds formed are sparingly soluble in mixtures of phenol-petroleum-ether, the phenol and the unreacted trifluoracetic acid phenyl ester can be dissolved with petroleum ether, whereby the N-trifluoracetylated compounds are in most cases separated off immediately in the form of crystals. If the solubility is too high, it is recommendable to distill off the phenol and the unreacted part of trifluoracetic acid phenyl ester under reduced pressure and to recrystallize the residue from an appropriate solvent or to sublime it in the high vacuum.

In the same manner the trifluoracetylation of peptides is successfully carried out. In this case it is, however, favorable to use an increased excess amount of trifluoracetic acid phenyl ester. In compensation thereof the quantity of phenol can be reduced. In most cases the N-trifluoracetylated peptides crystallize out already on cooling of the reaction mixture.

When using the process of the present invention which is, in general, performed very rapidly, the yields amount in most cases to above 90%. The compounds show an outstanding degree of purity. All N-trifluoracetylamino acids produced according to the new process are optically pure, with the exception of N-trifluoracetyl-histidine which is partly obtained as a racemate. When trifluoracetylating histidine a racemisation can, however, be avoided if during trifluoracetylation a tertiary base, for instance triethylamine, is added.

The following examples serve to illustrate the invention but they are not intended to limit it thereto.

*Example 1*

7.5 grams of glycine and 22.8 grams of trifluoracetic acid phenyl ester are heated with 10 grams of phenol until boiling sets in. 5 to 10 minutes later the glycine is completely dissolved. The reaction mixture is allowed to cool and the N-trifluoracetylglycine formed is precipitated by adding 200 cc. of petroleum ether. The precipitate is filtered off and, for purification, taken up in a little ether in which it is completely soluble. It is then reprecipitated with petroleum ether. The yield of N-trifluoracetylglycine amounts to 15.9 grams (=93% of the theoretical yield). The substance melts at 118° C.

*Example 2*

0.89 gram of DL-alanine, 3 cc. of trifluoracetic acid phenyl ester and 1 gram of phenol are heated, while stirring, until boiling sets in. After some minutes a clear solution is formed. Petroleum ether is added to the reaction mixture whereby the N-trifluoracetyl-DL-alanine is precipitated. The precipitate is filtered off with suction and washed with petroleum ether. The yield of N-trifluoracetyl-DL-alanine amounts to 1.7 grams (=92% of the theory). The compound melts at 120° C.

A sample is completely soluble in ether, i.e. free from alanine.

*Example 3*

12.4 grams of L-alanine and 32 cc. of trifluoracetic acid phenyl ester together with 15 grams of phenol are heated for 15 minutes for 130–140° C. Thereby a clear solution is formed. The phenol and the excess amount of trifluoracetic acid phenyl ester are distilled off under reduced pressure. A small amount of toluene is added to the reaction mixture and again distilled off. Upon new addition of toluene a precipitate of N-trifluoracetyl-L-alanine is formed on inoculation of the reaction mixture. The precipitate is filtered off with suction and thoroughly washed with petroleum ether. 21.1 grams of N-trifluoracetyl-L-alanine are obtained (=84% of the theory). The compound melts at 65–67° C. The rotation value amount to $[\alpha]_D^{22}$: −60.3° (c.=2 in water).

Example 4

4.7 grams of L-valine, 9 cc. of trifluoracetic acid phenyl ester and 5.5. grams of phenol are heated for 8 minutes to 140° C. The amino acid is completely dissolved already after about 3 minutes. The phenol and the excess amount of trifluoracetic acid phenyl ester are then distilled off under reduced pressure at a bath temperature up to 130° C. and under a pressure of 16 mm. of mercury. The residue is taken up in ether and the solution is filtered in order to be liberated from a small amount of undissolved valine. Upon elimination of the ether by distillation the residue is recrystallized from 20 cc. of toluene. 8.0 grams of N-trifluoroacetyl-L-valine (=94% of the theory) are obtained which melt at 86–87° C. The rotation value amounts to $[\alpha]_D^{24}$: −16.0° (c.=2 in water).

Example 5

1.3 grams of L-isoleucine are heated together with 2.3 grams (=1.8 cc.) of trifluoracetic acid phenyl ester to 135–140° C. The amino acid is dissolved within 5 minutes. Upon a further 2 minutes the reaction mixture is cooled and the greatest part of the excessive trifluoracetic acid phenyl ester is distilled off under reduced pressure. On trituration with petroleum ether (30 cc.) the residue crystallizes. The crystallizate represents N-trifluoracetyl-L-isoleucine. It is sublimed in the high vacuum ($10^{-3}$ mm. of mercury, 80° C. bath temperature). The sublimate is dissolved in ether. A remaining small residue is eliminated by filtration. The filtrate is again concentrated by evaporation. The N-trifluoracetyl-L-isoleucine crystallizes in fine needles. The yield amounts to 2.16 grams (=95% of the theory). The melting point amounts to about 65–67° C. (with sintering). The rotation value amounts to $[\alpha]_D^{20}$: +3.3° (c.=4 in alcohol).

Example 6

0.9 gram of L-tyrosine, 2.2 cc. of trifluoracetic acid phenyl ester and 3 grams of phenol are heated while stirring for 1 hour to 150–160 C. Upon cooling of the reaction mixture and addition of acetic acid ester a small amount of undissolved matter is filtered off. Acetic acid ester, phenol and unreacted trifluoracetic acid phenyl ester are distilled off under reduced pressure and the residue recrystallized from a mixture of ether and toluene. The yield of N-trifluoracetyl-L-tyrosine amounts to 1.2 grams (=88% of the theory). The compound melts at 191–192° C.

Example 7

2 grams of L-tryptophane, 2.2 cc. of trifluoracetic acid phenyl ester and 10 grams of phenol are heated, while stirring, for 75 minutes to 70–80 C. Upon cooling ether is added, whereby 0.6 gram of unreacted tryptophane is precipitated which is removed by filtration. When the solution is concentrated the N-trifluoracetyl-L-tryptophane that has formed is separated in an amount of 2 grams (=66% of the theory). (Referred to reacted L-tryptophane the yield amounts to 94% of the theory.) The melting point of the compound amounts to 160° C. The rotation value amounts to $[\alpha]_D^{24}$: +1.8 (c.=2 in alcohol). The melting point and the rotation value are not increased on recrystallization. No racemisation has taken place in the course of the reaction which can be proved by converting a sample of the substance by means of ammonia into tryptophane.

Example 8

A mixture of 7.7 grams of L-histidine, 11.2 cc. of trifluoracetic acid phenyl ester, 15 grams of phenol and 5.05 grams (=6.9 cc.) of triethylamine is heated for 15 minutes to 130–140° C. Upon cooling of the reaction mixture acetic acid ester is added, and the triethyl-ammonium salt of N-trifluoracetyl-L-histidine is obtained in an amount of 10.2 grams. By stirring with a weakly acid ion exchanger the compound is converted into the free acid. Upon concentration of the solution by evaporation under reduced pressure 8.1 grams (=65% of the theory) of N-trifluoracetyl-L-histidine are obtained melting at 207–208° C. The rotation value amounts to $[\alpha]_D^{24}$: +21.7 (c.=2 in water).

Example 9

0.95 gram of triglycine and 1.1 cc of trifluoracetic acid phenyl ester are heated for some minutes to 150° C. while 16 grams of phenol are added. The peptide is rapidly dissolved and the trifluoracetylated tripeptide soon starts separating off. In order to complete the separation the reaction mixture is triturated, upon cooling, with petroleum ether. The yield of N-trifluoracetyl-triglycine amounts to 1.3 grams (=90% of the theory). The melting point amounts to 225–228° C. (with decomposition).

Example 10

6.7 grams of DL-alanyl-glycine are heated with 13.8 cc. of trifluoracetic acid phenyl ester and 5 grams of phenol, to 140° C. After a few minutes the peptide is already completely dissolved. The reaction mixture is heated for a further few minutes and allowed to cool. Then petroleum ether is added, whereby the N-trifluoracetyl-DL-alanyl-glycine that has formed is crystallized out. The yield amounts to 10.9 grams (=98% of the theory). The compound melts at 117–118° C. Upon sublimation in the high vacuum under a pressure of $10^{-3}$ mm. of mercury 10.2 grams of the compound are obtained (=91% of the theory). The compound melts at 117–118° C.

Example 11

2.0 grams of glycyl-L-leucine, 4 cc. of trifluoracetic acid phenyl ester and 1.5 grams of phenol are heated together for 10 minutes to 130–140° C. Upon cooling of the reaction mixture the N-trifluoracetyl-glycyl-L-leucine starts crystallizing out. After addition of 100 cc. of carbon tetrachloride and 100 cc. of petroleum ether the mixture is allowed to stand for some time in the refrigerator and the precipitate is then sucked off. The yield amounts to 2.9 grams (=94% of the theory). The melting point of the compound amounts to 185–186° C, the rotation value to $[\alpha]_D^{21}$: −24.1° (c.=2 in alcohol).

We claim:
1. Process for N-trifluoracetylating a starting material selected from the group consisting of α-amino carboxylic acids and peptides composed thereof, said acids and peptides having at least one hydrogen substituted on an amino nitrogen atom, which comprises heating said starting material with at least one mol of trifluoracetic acid phenylester per amino group present in the starting material at a temperature in the range of about +50 to +160° C.

2. Process as defined in claim 1 wherein phenol is used as solvent.

3. Process as defined in claim 1 wherein the reactants are heated to a temperature between about 120 and 150° C.

4. Process as defined in claim 1 wherein the proportion of trifluoracetic acid phenyl ester per amino group is between about 1.2 and 1.5:1.

References Cited by the Examiner

UNITED STATES PATENTS

| | | | |
|---|---|---|---|
| 2,824,139 | 2/58 | Barnhart et al. | 260—595 |
| 2,938,023 | 5/60 | Weygand et al. | 260—112 |
| 3,030,380 | 4/62 | Weygand et al. | 260—112 |
| 3,133,908 | 5/64 | Klevens | 260—112 |

FOREIGN PATENTS 818,519  8/59  Great Britain.

OTHER REFERENCES

Schallenberg et al.: Journal of the American Chemical Society, vol. 77, pages 2779-83 (1955).

Greenstein: Chem. of the Amino Acids, vol. 2, John Wiley and Sons, New York (1961) (pages 911-916).

Greenstein: Chem. of the Amino Acids, vol. 2, John Wiley and Sons, New York (1961) (pages 1028 and 1042).

WILLIAM H. SHORT, *Primary Examiner.*

L. ZITVER, JAMES A. SEIDLECK, L. J. BERCOVITZ,
*Examiners.*